April 10, 1962     S. A. FOX     3,029,358
GAS CHROMATOGRAPH IONIZATION DETECTOR
Filed July 13, 1959     2 Sheets-Sheet 2
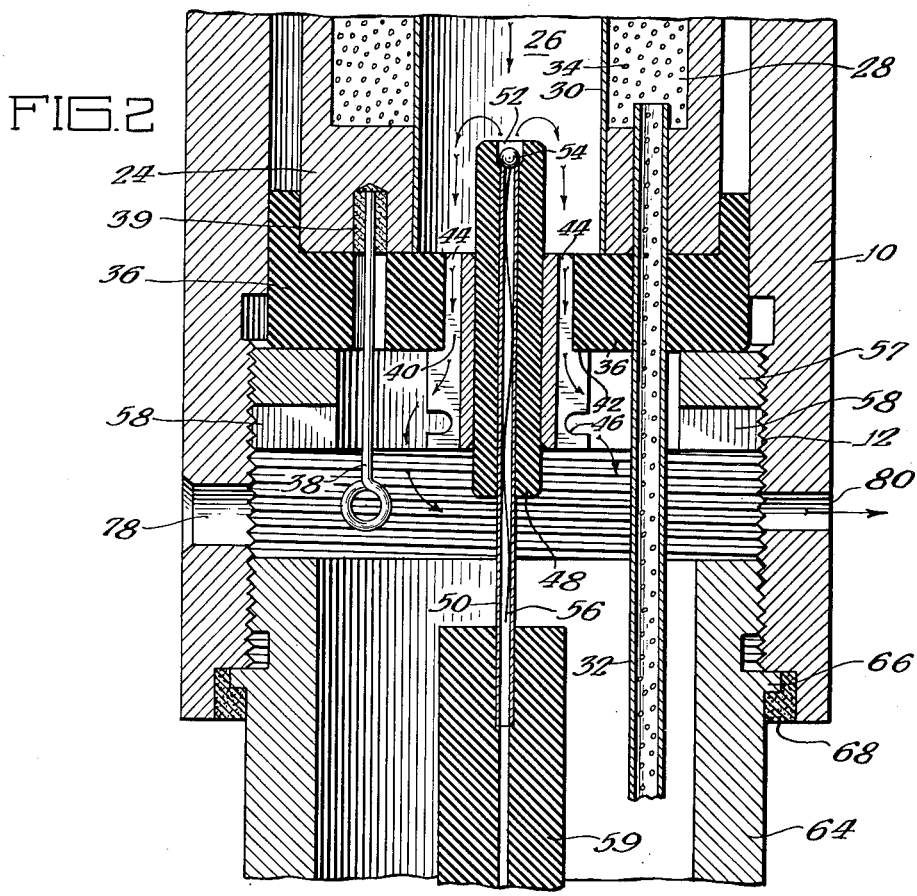
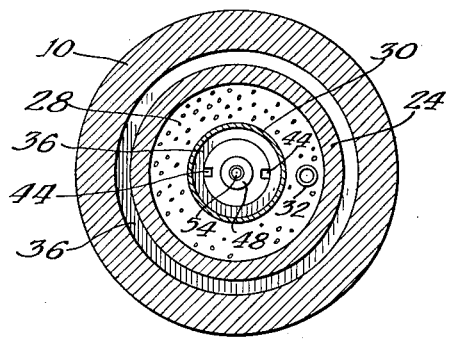
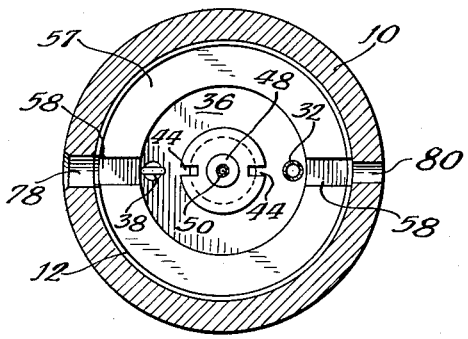
Inventor:
Stewart A. Fox
By Graf, Nieman & Burmeister
Attorneys

United States Patent Office 3,029,358
Patented Apr. 10, 1962

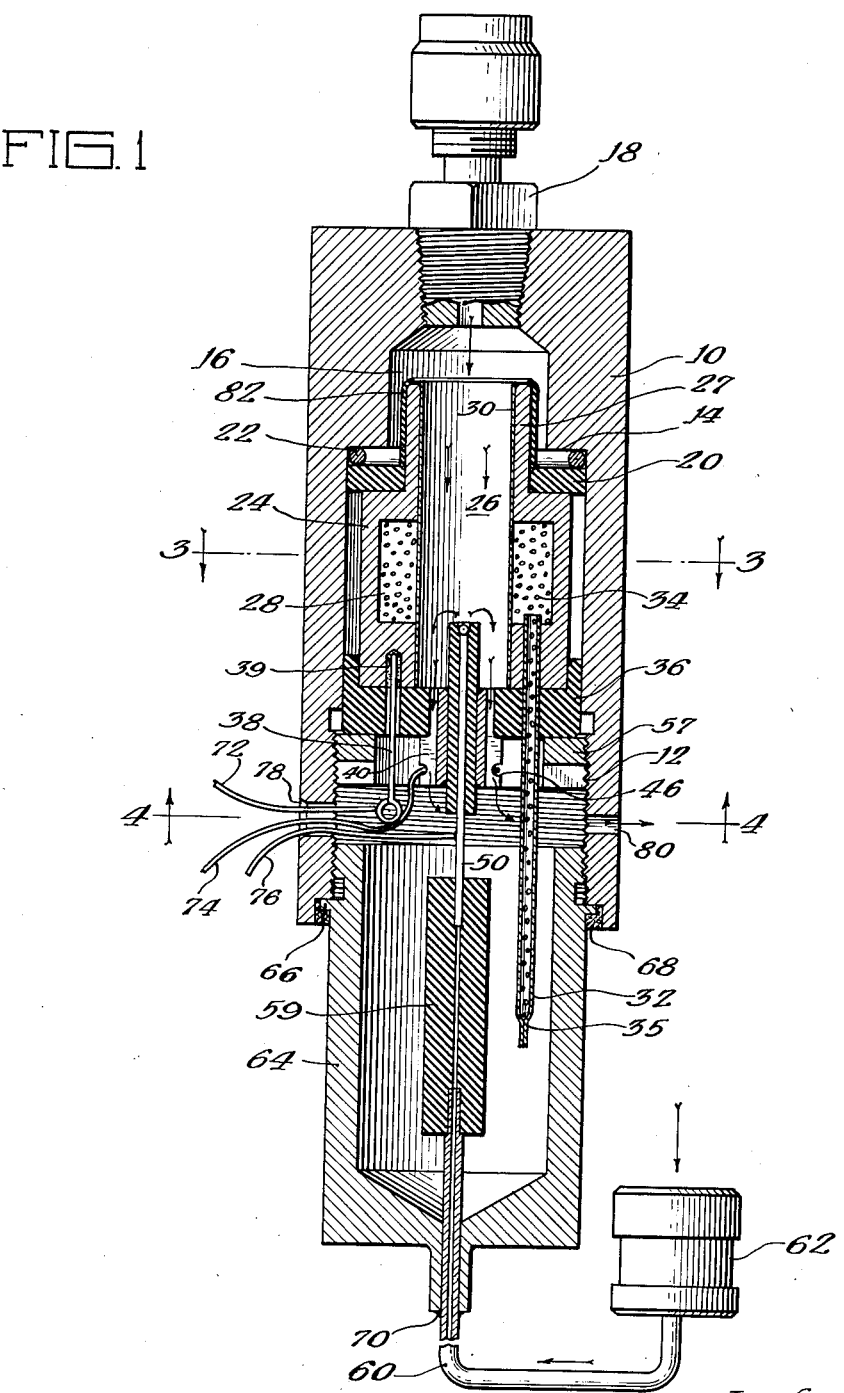

3,029,358
GAS CHROMATOGRAPH IONIZATION DETECTOR
Stewart A. Fox, Lyons, Ill., assignor to Nuclear-Chicago Corporation, Cook County, Ill., a corporation of Delaware
Filed July 13, 1959, Ser. No. 826,796
7 Claims. (Cl. 313—93)

This invention relates to a novel form of detector for the indication of the presence of small quantities of gases, particularly for use as the detecting element in gas chromatography.

Gas chromatographs in common use employ, as the basis of analytic indications, the time of progression of the various components of the gas under analysis through an elongated adsorbing and desorbing medium commonly known as the chromatography column. There are various known manners of producing indications of the exit of the successive components from the column, relying on various physical phenomena produced. Since the operation depends on ability to detect the emergence from the column of the successive components under examination, the sensitivity of the system is limited by the sensitivity of the detector. In a paper in the Journal of Chromatography, volume 1, page 35, there is described by J. E. Lovelock a type of detector which relies, as its principle of operation, upon ionization of organic components by exposure to the metastable atoms of inert gases subjected to radioactivity bombardment. In a further paper, the same author has described a refinement in which the gas under measurement is introduced into an ionization chamber in a region of high potential gradient, thus increasing the effect of the presence of the organic vapors under measurement on the ionization current in the chamber, which is operated at a potential substantially above the saturation potential in order to increase both the absolute value of the ionization current and the magnitude of the change of ionization current which occurs when the organic vapors appear at the end of the chromatography column.

It is the principal object of the present invention to provide a novel construction for the type of gas chromatography detector discussed above, which is suitable for commercial production at reasonable cost and which is of the ruggedness and durability required for incorporation in chromatographic instruments to be employed on a routine basis in laboratories and similar installations with a minimum of maintenance and care.

The manner of achievement of this principal object will be seen from the particular embodiment of the invention herein to be described. In the achievement of this principal object, however, it will further be seen that there are provided various features of construction which may be employed for somewhat different purposes, for example for the detection of organic vapors or other gases for purposes other than chromatography. For understanding of the invention, reference is made to the annexed drawing, in which:

FIGURE 1 is a view in longitudinal section (certain conventional parts being shown in elevation) of a gas chromatograph ionization detector constructed in accordance with the invention;

FIGURE 2 is an enlarged view of a portion of FIGURE 1;

FIGURE 3 is a transverse sectional view taken along the line 3—3 of FIGURE 1 in the direction indicated by arrows in that figure; and FIGURE 4 is a transverse sectional view taken along line 4—4 of FIGURE 1 in the direction indicated by arrows in that figure.

As may be seen in the drawing, the device of the invention includes a substantially cup-shaped main housing 10 of a material such as stainless steel, internally threaded at 12 at the mouth, or lower end. (For purposes of convenience of description, reference will occasionally be made herein to terms such as "upper" or "lower" with reference to the orientation of the device as shown in the drawing; however, it will of course be understood that such terms are simply for convenience of understanding, since the illustrated device can be, and is, used in any position.) In the upper portion of the housing 10 is a shoulder 14 which narrows the housing cavity to the reduced dimension of a gas inlet portion 16 to which is secured a gas inlet fitting 18 of conventional construction.

Seated on the shoulder 14 is an annular insulator ring 20, an O-ring 22 forming a seal at this seat. Within the central portion of the housing cavity, having its upper end seated against the insulator 20, is a cathode block 24, of brass or other suitable material, having a central aperture 26; the cathode block 24 also has an extension portion 27 of reduced diameter extending up through the insulator 20 and into the gas inlet portion 16 of the housing cavity. The block 24 has on the internal surface thereof an annular groove 28. The central aperture 26 in the cathode block is lined with a very thin liner tube 30, for example of electro-formed nickel of a thickness of 25 milligrams per square centimeter. There is thus formed an annular gas chamber surrounding the central aperture in the cathode and having a thin radiation-transparent conducting window facing the axis of the cathode. A gas-fill tube 32 extends downward from this chamber throuh the lower part of the cathode block, being employed for filling the mentioned chamber with a radioactive gas 34, such as krypton 85, constituting a source of beta rays which readily penetrate the window to ionize gas present in the cathode space, the radioactive gas named being highly safe for use because of the fact that it constitutes no hazard to personnel in the event of accident, since it is harmlessly diffused into the atmosphere. The lower end of the gas-fill tube 32 is sealed off at 35 in a conventional manner.

The lower end of the cathode block 24 rests in a cup-shaped insulator 36 of an outer diameter corresponding to the inner diameter of the central portion of the housing. A suitable aperture in the insulator 36 passes the gas-fill tube 32 and a further aperture passes a cathode terminal rod 38 soldered at 39 into a suitable bore in the cathode block.

Force-fitted through the central portion of the insulator 36 is the upper portion of a guard-ring bushing 40, of brass or other conducting material, properly positioned by a shoulder 42. The bushing 40 has diametrically opposed longitudinal slots 44 serving as gas exit passages from the interior of the cathode to the region of the housing below the insulator 36. An external circumferential groove 46 on the bushing serves to facilitate its electrical connection later to be described.

Force-fitted through the bushing 40 is an elongated insulator 48 with an axial bore containing a conducting capillary tube 50 which terminates at the bottom of an enlargement 52 of the upper end of the bore in the insulator 48. A ball or bead electrode 54 rests in the bore enlargement 52, and a fine wire, for example of gold, depends from the ball electrode into the capillary tube 50 and establishes electrical contact between the electrode 54, which serves as the anode of the ionization chamber, and the tube 50.

The assembly thus far described is fixedly mounted in position in the housing 10 by an externally threaded ring 57 provided with wrench slots 58.

The downwardly extending end of the capillary tube 50 terminates in an insulator 59 having an axial capillary bore, the lower end of which is coupled to a further capillary tube 60 having a coupling or fitting 62 for connection to the exit end of a gas chromatography column. The capillary 60 passes through the center of the end wall of a cup-shaped housing cap 64, the mouth of which threadedly engages the main housing 10 to enclose completely all of the assembly described above other than the gas connectors 18 and 62. A flange 66 on the housing cap 64 fixes the position of the cap, and the enclosure thus formed is sealed by a plastic steel packing 68 and by soldering at 70 which seals the central bore in the end wall of the cap 64.

A cathode connector wire 72, soldered to the cathode terminal 38, a guard-ring connector wire 74 wrapped and soldered in the groove 46, and an anode connector wire 76 soldered to the capillary 50 are brought out to a cable aperture 78 in the main housing 10. (It will of course be understood that in actual practice, the lead wires are incorporated in a suitable shielded cable snugly fitting the cable aperture 78, the assembly of the wires as a unitary cable being omitted in the drawing for purposes of simplicity.) A venting aperture 80 permits the flow of gas from the sealed assembly to the surrounding atmosphere.

The construction thus having been described, the operation and advantages of the described structure may readily be understood. As previously indicated, the coupling 62 is connected to the output of the chromatography column, and the exit gas from the column enters the ionization chamber through the capillary tubes 60 and 50, the intermediate insulating capillary 59 electrically isolating the high potential ball electrode 54 from the grounded housing. The exit gas from the column enters the chamber directly adjacent to the ball, where the potential gradient of the electric field between the anode and the cathode is maximized, this region being the region in which electron multiplication occurs when the chamber is operated above saturation potential. The connector 18 is connected to a source of a gas such as argon (which may also be employed as a carrier gas in the chromatograph column). The organic components, being of sufficiently low ionization potential to be ionized by the metastable argon atoms produced by the radioactive bombardment and the potential field, produce, upon their appearance in bursts, corresponding bursts of ionization current. The inert gas filling of the cathode space is constantly replaced by continuous flow of the flushing gas, thus promptly removing the column exit gas from the ionization chamber to the lower region of the housing and thence through the outlet vent 80, as indicated by arrows in the drawing.

It will be seen that the basic theory of operation is essentially the same as that discussed in the publications mentioned previously. However, it will also be seen that the structure illustrated and described presents a highly practical and rugged, and simply fabricated, construction for the utilization of these principles. In addition to the high degree of safety, which makes it unnecessary to take any unusual precautions despite the employment of radioactivity, the structure is highly durable, since the manner of securing the electrodes in position renders the structure virtually free of being subject to substantial damage or internal change due to vibration, jarring, or other similar causes. This resistance to damage makes it practical to seal the entire housing completely to further assure against the possibility of injury to personnel due to exposure of the radioactive source by reason of tampering or accidental disassembly. It will further be noted that the device is so constructed as to minimize the possibility of short circuits or unwanted discharges due to dust, etc. The extending upper portion 27 of the cathode is covered by a suitable insulating material 82, such as a tape, to prevent discharges between this portion of the cathode and the grounded housing 10. The air gap surrounding the main portion of the cathode block 24 is fully sealed against the entrance of dust, moisture, etc., and any possibility of spurious results due to insulator leakage is avoided by the presence of the guard bushing. All of these objects are accomplished with a minimum of complexity in the structure.

The simplicity of construction makes possible a chamber device of extremely small effective dimensions without the necessity of economically prohibitive precision operations in manufacture. In one particular construction, the interior diameter of the cathode is approximately one centimeter, the capillary tube being hypodermic needle tubing of an inside diameter of 10 mils, the anode ball being of 25 mil diameter with a 5 mil gold wire establishing electrical contact in the capillary.

It will readily be seen that the teachings of the invention may be adapted to constructions which differ in various details from the particular embodiment shown. Accordingly, the scope to be afforded the invention shall be determined only from the annexed claims.

What is claimed is:

1. An ionization detector comprising a cup-shaped housing member having an internal shoulder and having a gas inlet passage in the end wall thereof and being internally threaded at the mouth portion, an annular insulator seated on the shoulder, a centrally apertured cathode block having an annular groove in the inner surface thereof, a thin conducting tube on said inner surface underlying the groove to form an annular chamber having a conducting window facing the axis of the cathode block, a body of radioactive gas within the annular chamber so formed, the cathode block having a portion seated on the insulator and a reduced portion extending through the insulator, each of said portions being of lesser transverse dimension than the respective adjacent portions of the housing member to form insulating gaps, a second insulator abutting against the opposite end of the cathode block and of transverse dimension corresponding to the inner dimension of the housing, a lock ring abutting against the second insulator and threadedly engaged with the mouth portion of the housing to secure the insulators and the cathode block in position, a conducting capillary tube extending centrally through the second insulator and terminating within the aperture in the cathode block, an anode member on the end of the capillary tube, and gas passages adjacent to the capillary tube.

2. The ionization detector of claim 1 having a second cup-shaped housing member having a mouth portion threadedly engaging the mouth portion of the first housing member, a conducting capillary tube extending through the end wall of the second housing member, and an insulating coupling connecting the ends of the first mentioned and last mentioned capillary tubes, at least one of said housing members being vented in the region between the second insulator and the end wall of the second housing member to permit the escape of gas entering said region through the gas passages.

3. An ionization detector comprising a hollow conducting cylinder, an annular groove in the inner surface of the cylinder, a thin conducting tube on the inner surface of the cylinder overlying the groove to form an annular chamber having a conducting window facing the axis of the cylinder, a body of radioactive gas within the annular chamber so formed, an anode electrode on the axis of the chamber, gas entry means closely adjacent to the anode electrode, and means for flowing a flushing gas through the thin tube.

4. An ionization detector comprising a cup-shaped housing member having an internal shoulder and having a gas inlet passage in the end wall thereof and being internally threaded at the mouth portion, an annular insulator seated on the shoulder, a centrally apertured tubular electrode having a body portion seated on the insulator and a portion extending through the insulator, each of said portions being of lesser transverse dimension than the respective portions of the housing member to form insulating gaps, a second insulator abutting against the opposite end of the tubular electrode and of transverse dimension corresponding to the inner dimension of the housing, a locking ring abutting against the second insulator and threadedly engaged with the mouth portion of the housing to secure the insulators and the tubular electrode in position, a central electrode extending centrally through the second insulator and terminating within the aperture in the tubular electrode, and gas passages adjacent to the central electrode.

5. The ionization detector of claim 4 having a conducting member extending through the second insulator in alignment with the central aperture in the cathode block and surrounding, and insulated from, the central electrode to form a guard ring.

6. The detector of claim 5 wherein the gas passages comprise apertures in the guard ring so formed.

7. An ionization chamber and source construction comprising a conducting tube, an annular groove in the inner surface of the tube, a thin conducting member on the inner surface of the tube overlying the groove to form an annular chamber having a conducting window facing the axis of the tube, a body of radioactive gas within the annular chamber so formed, and an electrode on the axis of the tube.

References Cited in the file of this patent

A Radiological Detector for Gas Chromatography, by Deal et al., from Analytical Chemistry, vol. 28, No. 12, December 1956, pages 1958 to 1964.